Nov. 9, 1965   J. V. MILLER   3,216,247
WIND-MEASURING METER DEVICE
Filed Feb. 11, 1963

JACK V. MILLER
INVENTOR.

BY Allen E. Botney

ATTORNEY 3,216,247
WIND-MEASURING METER DEVICE
Jack V. Miller, Azusa, Calif., assignor to Electro-Optical Systems, Inc., Pasadena, Calif.
Filed Feb. 11, 1963, Ser. No. 257,512
5 Claims. (Cl. 73—189)

The present invention relates to the metering art for measuring wind direction and the pressures produced by winds upon vehicles traveling through the atmosphere, and more particularly relates to a metering device of the type mentioned that employs electro-optical principles.

Knowledge as to the winds that occur in the lower and upper reaches of the earths atmosphere can be important for a number of reasons. Thus, for example, accurate information as to wind direction and intensity is important in meteorlogical studies, not only for purely scientific reasons but also, from a practical point of view, for weather control and weather warning purposes. It is also important to have this kind of information in the design and control of high-speed and high-flying aircraft as well as missiles and rockets. In connection with missile and rocket vehicles, for example, the guidance system provides the steering orders for control of vehicle attitude and trajectory. The control system maintains the proper attitude in the presence of disturbing influences. Hence, the design of a guidance and control system requires an accurate knowledge of the air frame bending modes and resident vibrations likely to be encountered during flight. The instrument characteristics imposed by guidance and control considerations stem from the need to detect the disturbing influences with which the guidance and control system must cope. If these disturbing influences can be predicted from previous flight tests, the control system can be better designed to cope with them. Thus, an accurate knowledge of the magnitude, direction and frequency of these disturbing influences, such as the winds previously mentioned, will enable the guidance and control system designer to build in the proper lead time for the control system. By so doing, the instant a gust of wind is detected, a signal can be sent to the guidance system to begin to generate a steering command to oppose this disturbing influence even before the vehicle itself has begun to respond to it. Consequently, a more accurate trajectory can be maintained for the vehicle.

One of the disadvantages of present-day meter devices of this sort is that the moving elements in such devices have, relatively speaking, too much mass associated with them, with the result that too much inertia has to be overcome in order to make the system respond quickly to the wind affects. Response time is important because pressure changes in the order of twenty-five percent per second have been experienced. In addition, due to the relatively high masses involved, the frequency response of these meter devices is relatively low, thereby producing inaccuracies in the measurements they make. Furthermore, the moving elements in these earlier devices are mounted on bearings which inherently involve a certain amount of friction, thereby reducing very greatly the sensitivity of the instrument. Also, data pick-offs from these meters are customarily electro-mechanical in nature, usually a potentiometer which, as is well known, includes a wiper element that moves along a resistive element. The data pickoff, therefore, adds to the frictional forces encountered. Friction is important and must be minimized because it reduces the sensitivity of these instruments and, as will be recognized by those skilled in the art, a very high degree of sensitivity is required at the higher altitudes where the atmosphere is thinnest.

The present invention either eliminates or substantially overcomes the several disadvantages mentioned above of present day wind metering instruments and, in accordance with the basic concept of the present invention, this is made possible by using an electro-optical pickoff. More particularly, an embodiment of the invention includes a simple cone or vaned cone that has a two-axes pivot at its tip, the pivot being well ahead of the center of the pressure of the cone, which permits the cone to weather vane into the remote relative wind. A simple and lightweight cone can be fabricated using the electro-forming process, a miniature bellows that acts as a two-axes flexure pivot being fabricated at the same time as a part of the conical skirt. Also included in such an embodiment are an extremely lightweight electroformed mirror that is attached to the cone, a light beam source, and a two-axes lateral photocell type of device. The essence of the operation involves reflecting the aforesaid light beam off the electroformed mirror and onto the two-axes lateral photocell device, movement of the cone is responsive to wind pressures or forces being sensed or determined by the coordinates of the position of the point of light on the photocell plane.

The electro-optical nature of the present invention makes it possible to provide a wind-metering instrument that is essentially friction free about its operational null. This together with the fact that it encompasses the use of a large surface area of extremely low mass and inertia for wind response and a frictionless pivot point also makes it possible to provide optimum sensitivity and frequency response in such an instrument.

Accordingly, it is an object of the present invention to provide a wind-metering instrument having great sensitivity and fine frequency response.

It is another object of the present invention to provide a wind-metering instrument that substantially eliminates the deleterious effect of friction.

It is a further object of the present invention to provide a wind-metering instrument that operates on the basis of electro-optical principles.

It is an additional object of the present invention to provide a wind-metering instrument in which parts move relative to each other in a substantially frictionless manner.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is expressly understood, however, that the drawing is for the purpose of illustration and description only and is not intended as a definition of the limits of the invention.

Figure 1A:
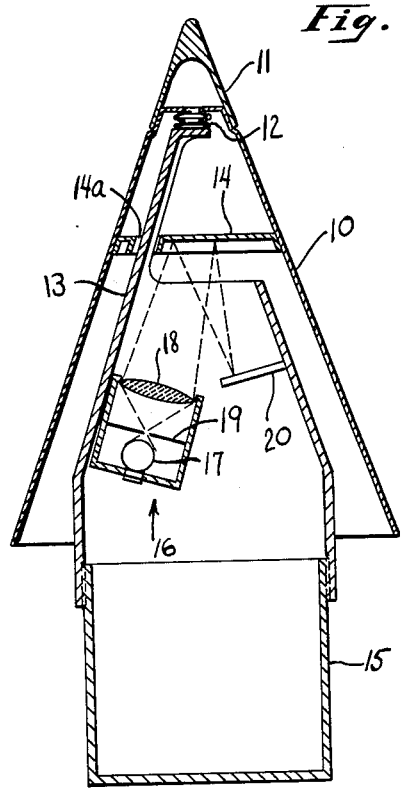
FIGURE 1(a) is a cross-sectional view of a wind-metering instrument constructed in accordance with the concepts and principles of the present invention.

Referring now to the drawings, reference is made to FIG. 1(a) wherein an instrument constructed in accordance with the present invention is shown to include a hollow conical member 10 at the apex of which is mounted, for protective purposes, a nose cone 11. Manufactured with cone 10 as an inherent part thereof is a flexure pivot 12, at the bottom of which is mechanically attached a mast strut 13. Within the hollow confines of cone 10 and attached to its sides for support is a mirror device 14, device 14 preferably being mounted so as to be parallel to the base of the cone and with the mirror surface of this device being on its bottomside. As shown in the figure, to one side of mirror device 14 is an aperture 14a through which a mast structure 13 extends, the upper part of the mast structure 14a, that is, that part of it that lies above the aperture being the mast strut whereas that part of structure 13 that lies below aperture 14a is the mast itself which, like cone 10, is hollow and conically shaped. Mast structure 13 is rigidly affixed at its bottom to a housing structure 15 which houses the electronic equipment that would be used with any embodiment of the present invention, such as power supplies, amplifiers, etc. Since this is considered standard equipment and, furthermore, since it is not considered pertinent to the invention, the electronic equipment is not shown. It should be mentioned, however, that because mast structure 13 is mounted on housing structure 15, the mast structure is rigidly held in place, that is to say, it is immovable. It should also be mentioned at this time in connection with aperture 14a, through which the mast structure extends, that the aperture is wide enough to permit movement of cone 10 about the mast structure, the width of the aperture being determined by the wind forces that are expected to be encountered and the restoring forces of flexure pivot 12.

Within the hollow confines of the mast and rigidly mounted to the wall thereof is a light-source arrangement generally designated 16 which comprises a lamp 17, a light-converging lens 18, and a mask 19 interposed between the lamp and the lens, the mask having a pinhole at its center to provide a point source of light. Also mounted to the wall of the mast at a point where it will received the light reflected from mirror 14 is a radiation tracking transducer 20 whose function it is to generate a voltage that will vary in amplitude and polarity according to the position of a spot of light on its surface. A complete description of a radiation tracking transducer of the kind that may be used in the embodiment of the present invention being described may be found on pages 336–341 of an article entiltled "Radiation Tracking Transducer" by D. Allen, I. Weiman and J. Winslow, in the periodical entitled I. R. E. Transactions on Instrumentation, published in December 1960.

With respect to the manufacture of conical skirt 10, a number of different techniques are available. One such technique is the electroforming process previously mentioned, and since this is a well known process it is not deemed necessary to describe it in detail here. However, for the purpose of completeness, reference is made to page 2 of the patent to Blasius Bart, Patent No. 1,674,941, issued June 26, 1928, wherein may be found an early description of the abovesaid electroforming process. As was mentioned previously, flexure pivot 12 is an integral part of conical skirt 10 and, therefore, is electroformed at the same time. Mirror 14 may likewise be fabricated using the electroforming process. With respect to nose cone or nose tip 11, it provides a heat sink at the stagnation point. A secondary function of this heat sink is to provide a mechanical balance for the cone in order to locate the cone's center of gravity at the center of suppension. In this way, angular movements of the cone due to lateral vibrations may be entirely avoided even though the center of suspension of the cone is very close to the forward end.

Figure 1B:
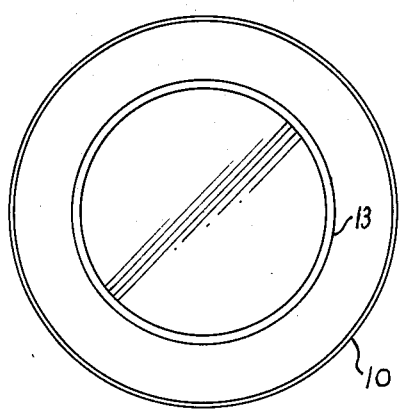
FIGURE 1(b) is essentially a bottom view of the overall instrument for the purpose of generally illustrating its form or configuration.
Figure 2:
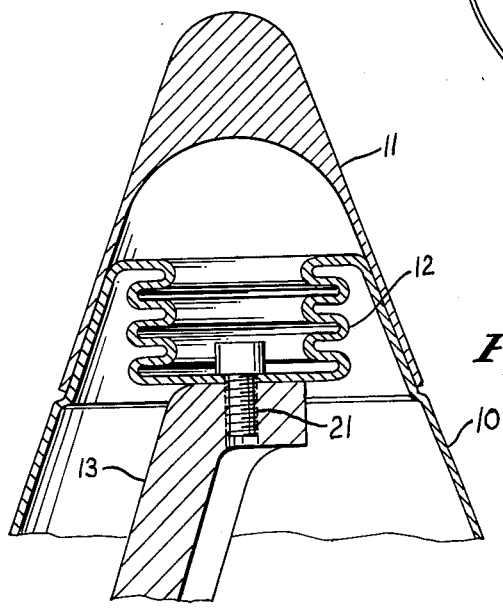
FIGURE 2 is a cross-sectional view, very greatly enlarged, of the uppermost portion of the instrument shown in FIG. 1(a).

The details of flexure pivot 12 is shown in FIG. 2 to which reference is now made. As is clearly shown therein, the flexure pivot is a bellows structure that is a continuation of conical skirt 10. As is also clearly shown and as was previously mentioned, the flexure pivot, that is to say, the bellows, is rigidly fastened to the mast strut, this being accomplished by bolting the two together by means of bolt 21. Also shown in FIG. 2 is nose cone or nose tip 11 which is tightly fastened over conical skirt 10 at its apex. A bottom view of the overall structure for the purpose of more clearly illustrating its shape is presented in FIG. 1(b).

In considering its operation, it should first be stated that the spacings between light-source structure 16, radiation tracking transducer 20, and mirror 14 is such that the converging beam of light projected toward the mirror is reflected from its surface to the radiation tracking transducer, the light becoming a point of light by the time it strikes the transducer surface. Thus, when conical skirt 10 is in a neutral position, that is to say, when there are no unbalanced wind forces acting against the conical skirt, the abovesaid point of light is at the center of the coordinate system on the transducer surface. Consequently, the voltage generated by the transducer is zero. However, should there be any unbalanced wind forces acting against the conical skirt, then conical skirt 10 will move about flexure pivot 12, the extent of the displacement of the skirt and the direction of its displacement depending upon the magnitude of the forces involved and their direction. Since mirror 14 is rigidly fixed to conical skirt 10, any displacement of the conical skirt will produce a corresponding displacement of the mirror, with the result that the angle of reflection of the light beam will also correspondingly change. Ultimately, therefore, the spot of light on the transducer surface will have a new coordinate position in accordance with the conical skirt displacement and this, in turn, will be measured by the amplitude and polarity of the voltage generated by the transducer. Although not shown because it is not deemed significant to the invention, this voltage out of the radiation tracking transducer is fed to the electronics in housing structure 15 wherein it is amplified and thereafter telemetered back to earth or otherwise used for control purposes.

Having thus described the invention, what is claimed is:

1. A wind-measuring meter comprising: a hollow cone having a bellows mounted near the apex of the cone in the hollow thereof and integral therewith; a rigid member positioned within the hollow of said cone and mechanically fixed to said bellows for suspending said cone over and around said member in a freely swivelable condition; and optical apparatus positioned within the hollow of said cone and affixed to said member for providing a measure of the displacement of said cone from its balanced position, said apparatus including an optical detector and means for projecting a spot of light onto said optical detector the position of said spot of light on said optical detector corresponding to the displacement of said cone from its balanced position.

2. A wind-measuring meter comprising: a hollow cone having a bellows integral therewith within the hollow near the apex of said cone; a rigid strut member positioned within the hollow of said cone and mechanically fixed at one end thereof to said bellows for suspending said cone over and around said member in a freely swivelable condition; and optical apparatus mounted entirely within the hollow of said cone for providing a measure of the displacement of said cone from its balanced position in response to wind forces acting thereagainst, said apparatus including means for projecting a converging beam of light, an optical detector that produces a voltage whose amplitude and polarity correspond to the position of a spot of light incident thereon, and a mirror mounted on and moving with said cone for reflecting said beam of light as a spot of light on said optical detector.

3. A wind-measuring meter comprising: a hollow cone having a bellows integral therewith within the hollow near the apex of said cone; a mirror rigidly mounted beneath said bellows between the sides of said cone and movable therewith; a rigidly positioned strut member extending through said mirror and mechanically fixed at one end thereof to said bellows for suspending said cone over and around said member in a freely swivelable condition; and optical apparatus mounted within the hollow of said cone and affixed to said strut member for providing a measure of the displacement of said cone from its balanced position in response to wind forces acting thereagainst, said apparatus including means for projecting a converging beam of light against said mirror, and an optical detector that produces a voltage whose amplitude and polarity correspond to the position of a spot of light incident thereon, said optical detector being positioned to receive the beam of light reflected from said mirror as a spot of light.

4. The wind-measuring meter defined in claim 3 wherein said optical detector is a two axis radiation tracking transducer.

5. A wind-measuring meter comprising: a truncated cone having a flexure pivot at the narrow portion thereof, said flexure pivot being formed integral with and extending from said cone within the hollow thereof; a mirror rigidly mounted between the walls of said cone beneath said flexure pivot and facing toward the base of said cone, said mirror having a hole through it; a rigidly positioned strut member extending through said hole and mechanically fixed at one end thereof to said flexure pivot for suspending said cone over said strut member in a freely movable condition; and optical apparatus mounted within said cone and to said strut member beneath said mirror for providing a measure of the displacement of said cone from its balanced condition in response to wind forces acting thereagainst, said apparatus including means for projecting a converging beam of light against said mirror, and an optical detector for producing a voltage whose amplitude and polarity correspond to the position of a spot of light incident thereon, said optical detector being positioned to receive the beam of light reflected from said mirror as a spot of light.

References Cited by the Examiner

UNITED STATES PATENTS

| 1,859,020 | 5/32 | Brown | 73—432 |
| 2,024,571 | 12/35 | Gent | 73—228 |
| 2,462,577 | 2/49 | Warren | 73—189 |
| 2,665,583 | 1/54 | Anjanos | 73—189 |
| 3,034,348 | 5/62 | Holderer | 73—147 |

FOREIGN PATENTS 1,093,099  11/60  Germany.

RICHARD C. QUEISSER, *Primary Examiner.*

JOSEPH P. STRIZAK, *Examiner.*